(12) United States Patent
Mantia et al.

(10) Patent No.: US 12,007,039 B2
(45) Date of Patent: Jun. 11, 2024

(54) PRESSURE REGULATING SHUT-OFF VALVE

(71) Applicant: Microtecnica S.r.l., Turin (IT)

(72) Inventors: Elio Mantia, Turin (IT); Matteo Cappo, Turin (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 18/174,791

(22) Filed: Feb. 27, 2023

(65) Prior Publication Data
US 2023/0341065 A1 Oct. 26, 2023

(30) Foreign Application Priority Data
Apr. 26, 2022 (EP) .................................... 22170101

(51) Int. Cl.
*F16K 31/124* (2006.01)
*F16K 1/30* (2006.01)

(52) U.S. Cl.
CPC ............ *F16K 31/124* (2013.01); *F16K 1/306* (2013.01)

(58) Field of Classification Search
CPC . F16K 1/221; F16K 1/24; F16K 17/36; F16K 31/003; F15B 20/002
See application file for complete search history.

(56) References Cited

U.S. PATENT DOCUMENTS

| | | | |
|---|---|---|---|
| 7,793,680 B2 | 9/2010 | Frampton | |
| 8,376,311 B2 * | 2/2013 | Marshall | F16K 1/221 74/25 |
| 9,110,475 B2 * | 8/2015 | Simpson | F16K 31/1635 |
| 9,222,596 B2 | 12/2015 | Maljanian et al. | |
| 9,273,795 B2 * | 3/2016 | Kamp | F16K 31/1245 |
| 9,341,280 B2 | 5/2016 | Pirat | |
| 9,933,085 B2 * | 4/2018 | LaVallee, III | F16K 31/1223 |
| 10,359,789 B2 | 7/2019 | Dante et al. | |
| 10,480,667 B2 * | 11/2019 | Mitchell | F16K 31/06 |
| 2006/0197043 A1 * | 9/2006 | Santinanavat | F16K 1/221 251/92 |
| 2012/0199211 A1 * | 8/2012 | Schroder | F01D 17/24 137/82 |
| 2013/0276892 A1 * | 10/2013 | Kamp | F04D 27/0215 251/305 |

(Continued)

OTHER PUBLICATIONS

European Search Report for Application No. 22170101.4, dated Oct. 24, 2022, 8 pages.

*Primary Examiner* — Umashankar Venkatesan
(74) *Attorney, Agent, or Firm* — CANTOR COLBURN LLP

(57) ABSTRACT

A pressure regulating shut-off valve has a valve member regulating flow of fluid between an inlet and an outlet. The valve includes a pneumatic actuator having a piston having first and second faces that define first and second volumes within a cylinder. The second face has a greater surface area than the first face. The first and second volumes are fluidly connected to the inlet, and an electrically actuated valve controls the flow of fluid along a fluid path to the second volume. The electrically actuated valve closes the fluid path, when power is supplied to the electrically actuated valve, and opens the fluid path, when power is removed from the electrically actuated valve, which causes the pneumatic actuator to act on the valve member to hold the valve member in a fixed position.

14 Claims, 3 Drawing Sheets

(56) References Cited

U.S. PATENT DOCUMENTS

2014/0361202 A1\* 12/2014 Maljanian .............. G05D 7/005
  251/30.01
2017/0336812 A1 11/2017 Dante et al.
2023/0264132 A1\* 8/2023 Coretto ................ B01D 46/521
  95/273

\* cited by examiner

PRESSURE REGULATING SHUT-OFF VALVE

CROSS-REFERENCE TO RELATED APPLICATIONS

This application claims priority to European Patent Application No. 22170101.4 filed Apr. 26, 2022, the entire contents of which is incorporated herein by reference.

FIELD

The present disclosure relates to a pressure regulating shut-off valve and a method of operating a pressure regulating shut-off valve.

BACKGROUND

Pressure regulating shut-off valves (PRSOVs) are designed to operate in the inlet anti-ice system of an aircraft engine. Their operation is generally known, for example, from US 2017/0336812 A1.

Typically, PRSOVs comprise a valve member (e.g. a regulating piston), the position of which controls downstream pressure by controlling the flow of fluid from the valve inlet to the valve outlet. The pressure regulating function of the PRSOV may be controlled by a pressure relief valve that controls a pressure acting on the valve member via a pneumatic line. The shut-off function of the PRSOV may be controlled by a solenoid valve, e.g. acting on the pneumatic line into the PRSOV.

PRSOVs must be reliable enough to ensure flight safety. It is important that the shut-off function of the PRSOV is predictable when power is lost, so to control the safety of the anti-ice system and thus flight safety.

It is desired to provide an improved pressure regulating shut-off valve that has a reliable shut-off function.

SUMMARY

In accordance with an aspect of the disclosure, there is provided a pressure regulating shut-off valve. The valve includes a valve member arranged to regulate flow of a fluid between an inlet and an outlet of the pressure regulating shut-off valve and a pneumatic actuator. The actuator includes a piston arranged for reciprocal motion in a cylinder. The cylinder and a first face of the piston define a first volume that is fluidly connected to the inlet of the pressure regulating shut-off valve, the cylinder and a second face of the piston define a second volume that is fluidly connected via a fluid path to the inlet of the pressure regulating shut-off valve the second face of the piston has a surface area that is greater than a surface area of the first face of the piston. The actuator also includes an electrically actuated valve arranged to control the flow of fluid through the fluid path. The electrically actuated valve is arranged to restrict or substantially close the fluid path between the inlet of the pressure regulating shut-off valve and the second volume, when power is supplied to the electrically actuated valve, the electrically actuated valve is arranged to derestrict or substantially open the fluid path between the inlet of the pressure regulating shut-off valve and the second volume, when power is removed from the electrically actuated valve, and the pneumatic actuator is arranged to act on the valve member, when power is removed from the electrically actuated valve, to hold the valve member in a fixed position.

In accordance with another aspect of the present disclosure, there is provided a method of operating a pressure regulating shut-off valve. In this method, the valve can be any valve disclosed herein. The method includes having: the electrically actuated valve restrictor substantially close the fluid path between the inlet of the pressure regulating shut-off valve and the second volume, when power is supplied to the electrically actuated valve; the electrically actuated valve derestrict or substantially open the fluid path between the inlet of the pressure regulating shut-off valve and the second volume, when power is removed from the electrically actuated valve; and the pneumatic actuator act on the valve member, when power is removed from the electrically actuated valve, to hold the valve member in a fixed position.

The present disclosure provides a pressure regulating shut-off valve having a valve member that regulates the flow of fluid between an inlet and an outlet of the PRSOV. The PRSOV also includes a pneumatic actuator having a piston with first and second faces that define first and second volumes within a cylinder of the pneumatic actuator in which the piston moves reciprocally. The second face of the piston has a greater surface area than the first face.

The first and second volumes are fluidly connected to the inlet of the PRSOV (and thus exposed to the same inlet pressure), and an electrically actuated valve controls the flow of fluid along a fluid path to the second volume. The electrically actuated valve restricts or substantially closes the fluid path, when power is supplied to the electrically actuated valve, and derestricts or substantially opens the fluid path, when power is removed from the electrically actuated valve. Derestricting or substantially opening the fluid path, when power is removed from the electrically actuated valve, causes the pneumatic actuator to act on the valve member, to hold the valve member in a fixed (e.g. open or closed) position.

Thus, owing to the imbalance in area of the faces of the piston and both faces of the piston being exposed to the same pressure (from the inlet of the PRSOV), when power is removed from the electrically actuated valve, the pneumatic actuator is arranged to act on the valve member to hold the valve member in a fixed position, when the PRSOV is subject to a loss of power. This helps to provide a defined failsafe position for the valve member.

The valve member of the PRSOV may be arranged in any suitable and desired way. In one embodiment the pressure regulating shut-off valve comprises a conduit, wherein the conduit comprises the inlet and the outlet and the valve member is located in the conduit between the inlet and the outlet. Thus the PRSOV controls (regulates) the flow of fluid through the conduit.

The valve member may comprise any suitable and desired valve member. In one embodiment the valve member comprises a butterfly valve.

The position of the valve member (e.g. the butterfly valve) may controlled (e.g. actuated) in any suitable and desired way. In one embodiment the valve member is electrically actuated. Thus the PRSOV may comprise an electrical (electrically powered) actuator arranged to actuate (e.g. control the position of) the valve member.

In one embodiment the electrical actuator is external to the conduit. In one embodiment the electrical actuator is connected to an axle of the valve member (e.g. a shaft of the butterfly valve), wherein the electrical actuator is arranged to actuate (e.g. control the position of) the valve member via the axle of the valve member.

The electrical actuator may comprise any suitable and desired electrical actuator, e.g. a primary (direct) electrical actuator or a secondary (indirect) electrical actuator. In one embodiment the electrical actuator comprises a torque motor, a direct drive mechanism or a geared drive mechanism (examples of primary electrical actuators), or a pneumatic actuator controlled by an electrical actuator such as a torque motor servo-valve (an example of a secondary electrical actuator).

In one embodiment the electrical actuator and the electrically actuated valve share a common power supply, e.g. a power supply to or of the PRSOV. Thus, when power is removed (lost) from the electrically actuated valve, power is also removed from the electrical actuator.

The pneumatic actuator that is arranged to act on the valve member, when power is removed from the electrically actuated valve, may be configured in any suitable and desired way to hold the valve member in a fixed position. The piston of the pneumatic actuator may be arranged to act directly on the valve member. In one embodiment the pneumatic actuator comprises a rod connected to the piston, wherein the rod is arranged to act on the valve member (when power is removed from the electrically actuated valve, to hold the valve member in a fixed position). The rod may be coaxial with the piston. The rod may be acted on by the piston or the rod may be an extension of (e.g. mechanically connected to) the piston.

The rod may be arranged to act on the valve member (when power is removed from the electrically actuated valve, to hold the valve member in a fixed position) in any suitable and desired way. In one embodiment the rod (and, e.g., the piston) is external to the conduit. Thus, the rod may be arranged to act on a part (e.g. axle or shaft) of the valve member that projects outside of the conduit (e.g. through a wall of the conduit).

In one embodiment the PRSOV comprises a rotatable member (e.g. a cam or lever) coupled (e.g. mechanically connected, e.g. mounted) to the valve member, wherein the (e.g. piston and/or rod of the) pneumatic actuator is arranged to act on the rotatable member so to act on the valve member (when power is removed from the electrically actuated valve, to hold the valve member in a fixed position). In one embodiment the rotatable member is external to the conduit. In one embodiment the rotatable member is coupled to the part (e.g. axle or shaft) of the valve member that projects outside of the conduit.

The pneumatic actuator acts to hold the valve member in a fixed position, when power is removed from the electrically actuated valve. Thus, the pneumatic actuator may be arranged to override (e.g. act against or disable) whatever is acting primarily to control the position of (e.g. actuate) the valve member, e.g. the electrical actuator. For example, the pneumatic actuator may be arranged to override a torque that is being applied to (rotate) the valve member. Thus, the pneumatic actuator may be arranged to substantially prevent rotation of the valve member, when power is removed from the electrically actuated valve.

In one embodiment, the pneumatic actuator is arranged to act on the valve member, when power is removed from the electrically actuated valve, to hold the valve member in an (e.g. fully) open position, e.g. to fluidly connect the inlet and the outlet, to allow fluid to (continue to) flow between the inlet and outlet of the (e.g. conduit of the) PRSOV.

In one embodiment, the pneumatic actuator is arranged to act on the valve member, when power is removed from the electrically actuated valve, to hold the valve member in a (e.g. fully) closed position, e.g. to fluidly isolate the inlet from the outlet, to substantially prevent fluid to flow between the inlet and outlet of the (e.g. conduit of the) PRSOV.

The pneumatic actuator may be arranged to have any suitable and desired behaviour when power is supplied to the electrically actuated valve. In one embodiment the pneumatic actuator is arranged to not interfere with (e.g. is held clear of) the valve member, when power is supplied to the electrically actuated valve. Thus, during normal operation, when power is being supplied to the electrically actuated valve (and, e.g., the rest of the PRSOV including the electrical actuator), the (e.g. piston and/or rod of the) pneumatic actuator does not interfere with the (e.g. rotatable member coupled to the) valve member, such that the valve member is free to move (e.g. rotate) or free to be actuated by the electrical actuator.

In one embodiment the pneumatic actuator is arranged to be removed from acting on the valve member, when power is resupplied to the electrically actuated valve (after the power has been removed from the electrically actuated valve). Thus, after power has been lost to the electrically actuated valve (and, e.g., the PRSOV) but then the power is resumed, the pneumatic actuator acts to remove itself from acting on the valve member, e.g. so to allow normal (e.g. pressure regulating) operation of the valve member.

Thus, the electrically actuated valve is arranged to restrict or substantially close the fluid path between the inlet of the pressure regulating shut-off valve and the second volume, when power is resupplied to the electrically actuated valve. This restricts or substantially prevents the flow of fluid (and thus supply of pressure) to the second volume, which causes a pressure imbalance between the first and second volumes owing to the reduction in pressure in the second volume, resulting in the piston moving to reduce the second volume and increase the first volume, and the pneumatic actuator no longer acting on the valve member.

The electrically actuated valve may comprise any suitable and desired electrically actuated valve that is able to control the flow of fluid through the fluid path between the inlet of the pressure regulating shut-off valve and the second volume, i.e. to restrict or substantially (e.g. fully) close the fluid path and to derestrict or substantially (e.g. fully) open the fluid path. In one embodiment the electrically actuated valve comprises a (e.g. normally open three-way) solenoid valve.

In one embodiment the (e.g. normally open three-way) solenoid valve is arranged to be substantially (e.g. fully) open when power is supplied to the solenoid valve and substantially (e.g. fully) closed when power is removed from the solenoid valve. In one embodiment the solenoid valve comprises two inlets and one outlet. The outlet may comprise the fluid path to the second volume from the solenoid valve. The inlets may comprise the fluid path into the solenoid valve (from the inlet of the PRSOV) and a vent.

Thus, in one embodiment, the solenoid valve is arranged to fluidly connect the second volume to the vent (via the fluid path), when power is supplied to the solenoid valve, the solenoid valve is arranged to fluidly connect the inlet of the PRSOV and the second volume (via the fluid path), when power is removed from the solenoid valve. Thus, in some embodiments, when power is supplied to the solenoid valve, the inlet of the PRSOV is not fluidly connected to the second volume.

When the solenoid valve is energised, such that the second volume is connected to the vent (thus restricting or substantially closing the fluid path from the inlet of the PRSOV owing to the solenoid valve diverting the second volume to be in fluid communication with the vent), this causes (e.g. a depressurisation of the second volume, such that) the pressure in the first volume (in fluid communication with the inlet of the PRSOV) to be greater than the pressure in the second volume (in fluid communication with the vent and, e.g., ambient pressure), which results in the piston reducing the second volume and increasing the first volume, and the pneumatic actuator to not (or no longer) act on the valve member.

When the solenoid is de-energised and thus the solenoid switches, such that the second volume is connected to the inlet of the PRSOV (via the fluid path through the solenoid, owing to the solenoid derestricting or substantially opening the fluid path between the inlet of the PRSOV and the second volume), the pressure in the first volume (in fluid communication with the inlet of the PRSOV) is substantially the same as the pressure in the second volume, which results in the piston reducing the first volume and increasing the second volume (owing to the greater surface area of the second face of the piston compared to the surface area of the first face), and the pneumatic actuator acting on the valve member.

When the solenoid is re-energised (and thus switches back to its original position), the second volume is again connected to the vent, such that the pneumatic actuator is removed from acting on the valve member.

Thus, in one embodiment, the electrically actuated valve is arranged to derestrict or substantially open the fluid path between the inlet of the pressure regulating shut-off valve and the second volume, when power is removed from the electrically actuated valve, so that substantially the same pressure is supplied to the first volume and to the second volume from the inlet of the pressure regulating shut-off valve.

The piston of the pneumatic actuator may be arranged to be moved, under the influence of the pressure from the inlet of the PRSOV, in any suitable and desired way. As outlined above, the pneumatic actuator is arranged for the first and second faces of the piston to be exposed to substantially the same pressure (e.g. a fluid pressure representative of the pressure in the inlet of the PRSOV) when power is removed from the electrically actuated valve. Owing to the surface area of the second face of the piston being greater than the surface area of the first face of the piston (such that the overall force from the pressure is greater on the second face than the force from the pressure on the first face), this actuates the piston to move the piston in a direction so as to reduce the first volume (and thus increase the second volume), to move the piston so that the pneumatic actuator acts on the valve member.

When power is supplied to the electrically actuated valve, the fluid path from the inlet of the PRSOV to the second volume is restricted or substantially closed (e.g. diverted to a vent from the second volume), such that only the first face of the piston is exposed to a pressure representative of the pressure in the inlet of the PRSOV. This causes a reduction in pressure in the second volume (e.g. owing to the second volume being connected to the vent), which actuates the piston to move the piston in a direction so as to reduce the second volume (and thus increase the first volume), to move the piston so that the pneumatic actuator is removed from acting on the valve member. Thus, when power is supplied to the electrically actuated valve, the piston is actuated in an opposite direction to the direction in which the piston is actuated when power is removed from the electrically actuated valve.

The piston (and, e.g., the rod and/or cam) may thus be moved from a first position (in which, e.g., the first volume is maximised and the second volume is minimised) to a second position (in which, e.g., the first volume is minimised and the second volume is maximised), when power is removed from the electrically actuated valve (and fluid pressure from the inlet of the PRSOV is allowed to act on the second face of the piston). Similarly, the piston (and, e.g., the rod and/or cam) may thus be moved from a second position to a first position, when power is resupplied to the electrically actuated valve (and fluid pressure from the inlet of the PRSOV is restricted or substantially (e.g. fully) prevented from acting on the second face of the piston). When the piston is in the first position, the pneumatic actuator is arranged to not interfere with the valve member. When the piston is in the second position, the pneumatic actuator is arranged to act on the valve member, to hold the valve member in a fixed position.

It will be appreciated that the features described herein with respect to the PRSOV apply equally to the method of operating the PRSOV.

BRIEF DESCRIPTION OF THE DRAWINGS

An embodiment will now be described, by way of example only, and with reference to the accompanying drawings in which.

DETAILED DESCRIPTION

Pressure regulating shut-off valves (PRSOVs) are designed to operate in the inlet anti-ice system of an aircraft engine. PRSOVs are able to provide both pressure regulating and shutoff functions. The shut-off function of the PRSOV is important such that when power is lost, safety of the anti-ice system and thus flight safety is maintained. An embodiment of a PRSOV in accordance with the present disclosure will now be described.

Figure 1:
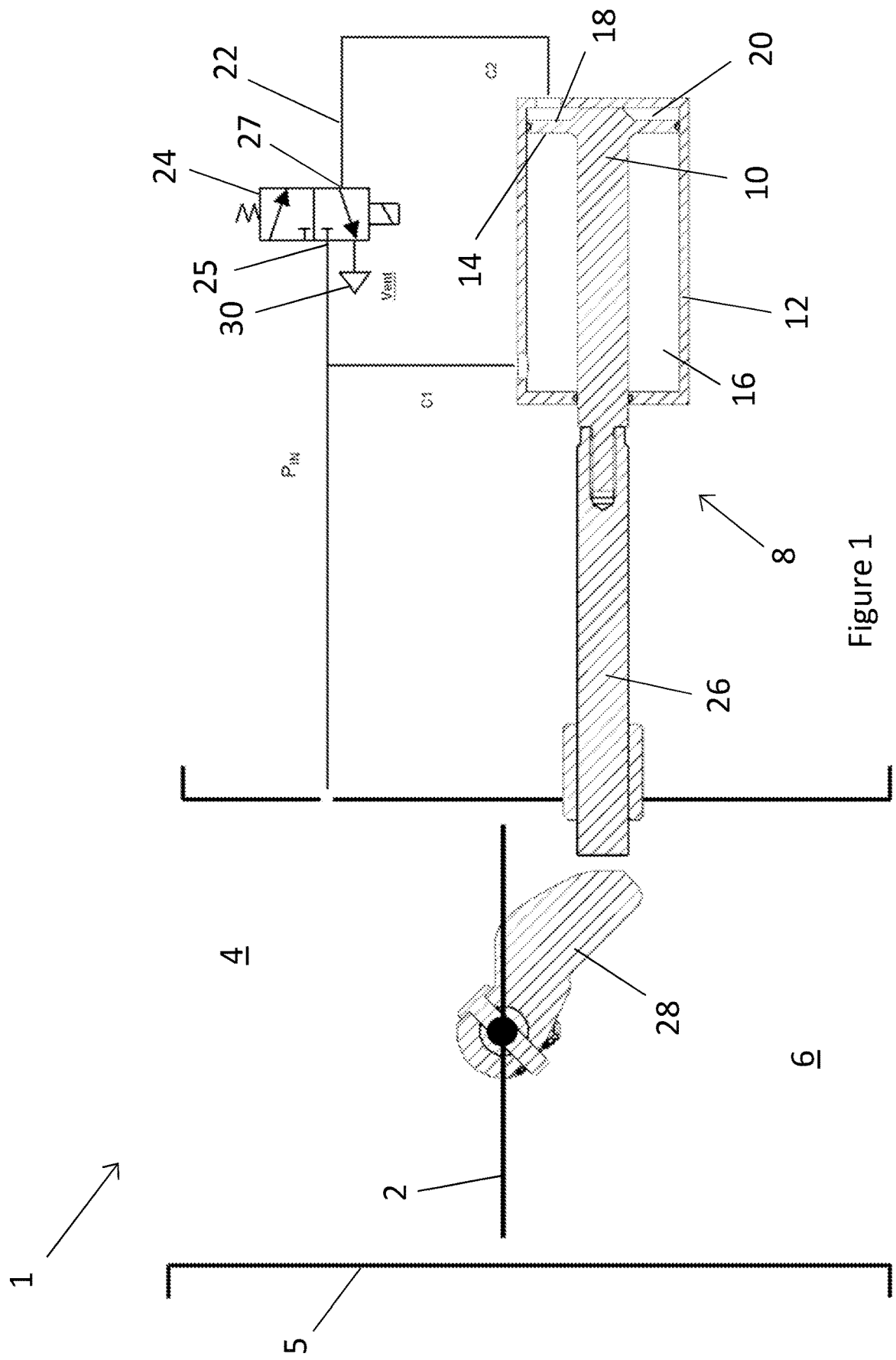
FIGS. 1 and 2 shows an embodiment of a pressure regulating shut-off valve in accordance with the present disclosure.
Figure 2:
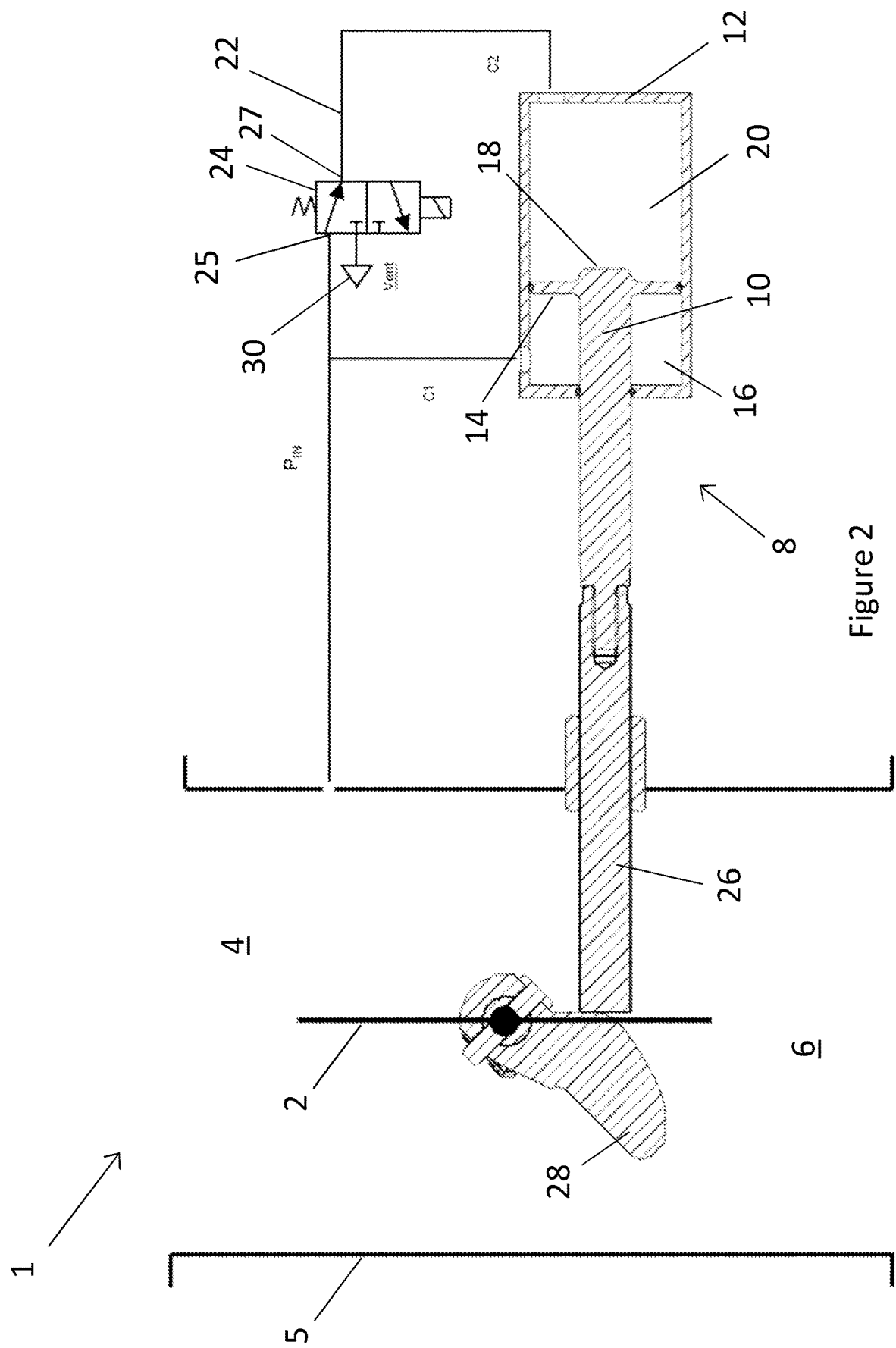

FIGS. 1 and 2 show schematic views of a pressure regulating shut-off valve (PRSOV) 1 in accordance with an embodiment of the present disclosure. The PRSOV 1 may, for example, be located in the inlet anti-ice system of an aircraft engine, e.g. to regulate the downstream engine bleed air pressures.

The pressure regulating shut-off valve 1 comprises a butterfly valve 2 between an inlet 4 and an outlet 6 of the PRSOV 1. The inlet 4 and the outlet 6 are defined in a conduit 5 through which engine bleed air flows. The butterfly valve 2 is arranged to regulate the flow of the engine bleed air through the conduit 5, e.g. for supply to the anti-ice system. FIG. 1 shows the butterfly valve 2 in a closed position, preventing the flow of the engine bleed air through the conduit 5. FIG. 2 shows the butterfly valve 2 in an open position, allowing the flow of the engine bleed air through the conduit 5.

The PRSOV 1 also includes a pneumatic actuator 8 having a piston 10 that moves reciprocally in a cylinder 12. The pneumatic actuator 8 has a rod 26 connected to the piston 10 that is arranged to selectively act on a cam 28 connected to the shaft of the butterfly valve 2. The cam 28 (along with the pneumatic actuator 8, including the rod 26) is located externally to the conduit 5.

The cylinder 12 and a first face 14 of the piston 10 together define a first volume 16, and the cylinder 12 and a second, opposite face 18 of the piston define a second volume 20. Both the first and second volumes are fluidly connected to the inlet 4 of the conduit 5. The surface area of the second face 18 of the piston 10 is greater than a surface area of the first face 14 of the piston 10.

A fluid path 22 connects the inlet 4 of the conduit 5 to the second volume 20. The flow of fluid through the fluid path 22 is controlled by a three way normally open solenoid valve 24. The three ports of the solenoid valve 24 are an inlet 25 that is fluidly connected to the inlet 4 of the conduit 5, a vent 30 and an outlet 27 that is fluidly connected to the second volume 20 of the pneumatic actuator 8.

Figure 3:
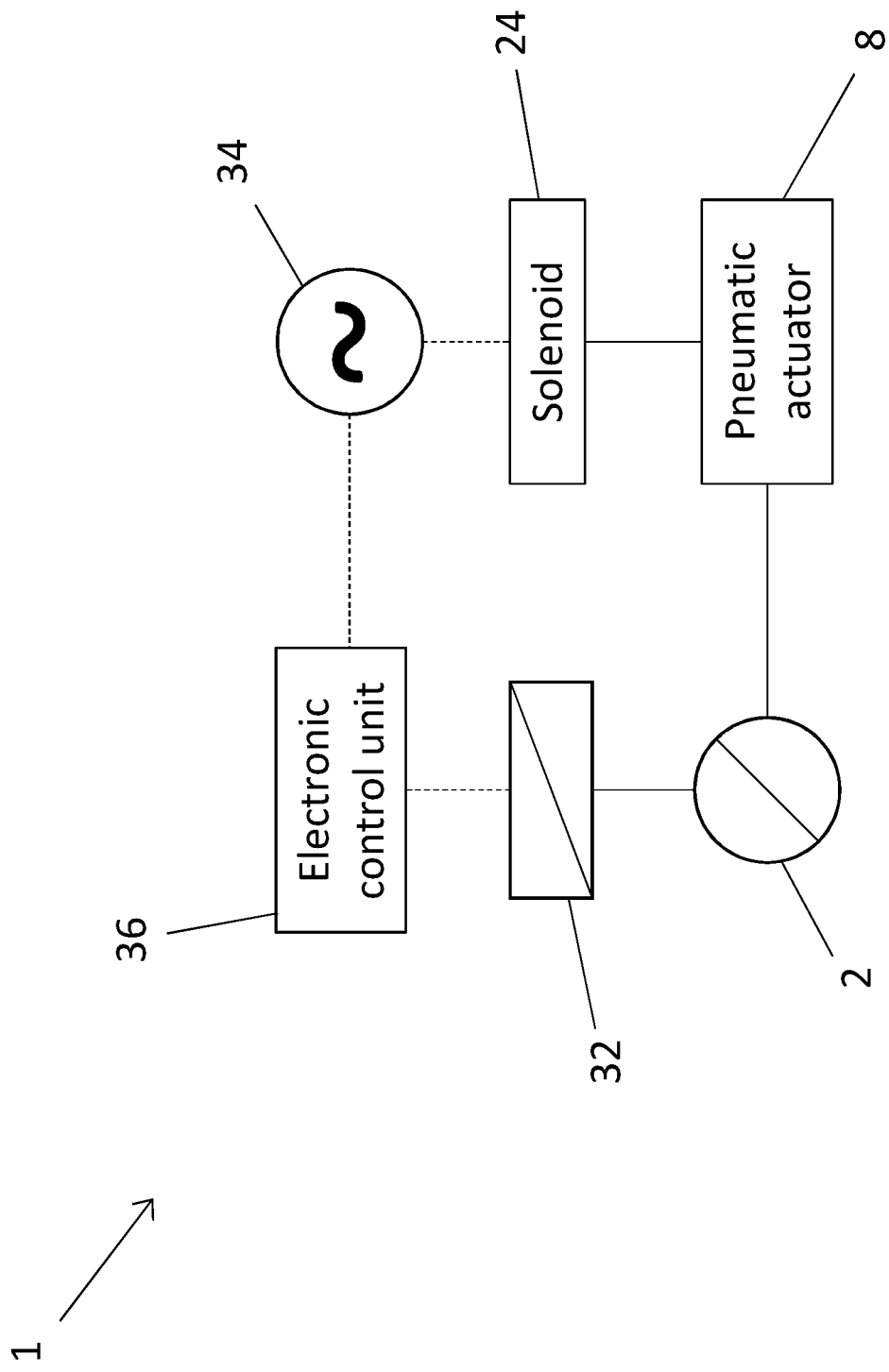
FIG. 3 shows schematically the pressure regulating shut-off valve shown in FIGS. 1 and 2.

FIG. 3 shows schematically the PRSOV 1. An electrically powered actuator 32 (e.g. a torque motor) acts on the shaft of the butterfly valve 2 to control its position, to regulate the flow of fluid through the PRSOV 1. The electrically powered actuator 32 and the solenoid 24 (which controls the flow of fluid through the fluid path 22 to the pneumatic actuator 8) both receive power from a common power supply 34 (e.g. a power supply of the aircraft engine on which the PRSOV 1 may be mounted). The electrically powered actuator 32 received power (and control signals) via an electronic control unit 36.

Operation of the PRSOV 1 will now be described, with reference to FIGS. 1, 2 and 3.

During normal operation, when power is supplied to the solenoid valve 24, the solenoid valve 24 closes the fluid path 22 and connects the second volume 20 of the pneumatic actuator 8 to the vent 30. This causes the inlet pressure (PIN) to act on the first face 14 of the piston 10, to move the piston 10 so to increase the first volume 16 and move the rod 26 away from acting on the cam 28 connected to the butterfly valve 2 (in the configuration shown in FIG. 1).

In this configuration, the butterfly valve 2 is able to be moved freely by the electrically powered actuator 32 (under control of the electronic control unit 36), to regulate the flow of fluid through the conduit 5 of the PRSOV 1.

When the power being supplied by the common power supply 34 is removed (e.g. lost), the electrically powered actuator 32 is no longer able to control the position of the butterfly valve 2. Power is also removed from the solenoid valve 24. This causes the solenoid valve 24 to open the fluid path 22, thus connecting the second volume 20 to the inlet pressure (PIN).

With the inlet pressure (PIN) now acting on both the first and second faces 14, 18 of the piston 10, the piston 10 is moved so to increase the second volume 20 and move the rod 26 towards acting on the cam 28 connected to the butterfly valve 2, owing to the greater surface area of the second face 18 (compared to the first face 14) of the piston 10. Thus the rod 26 acts on the butterfly valve 2, when power is removed from the solenoid valve 24, to hold the butterfly valve 2 fixed in an open position, as shown in FIG. 2.

The present disclosure thus provides a failsafe mode of operation for the PRSOV, when electrical power is lost to the PRSOV, to maintain a fixed state of the valve member. This helps to avoid situations such as fluid no longer being supplied to an anti-ice system.

It will be appreciated that other embodiments exist within the scope of the present disclosure. For example, the pneumatic actuator and the (e.g. butterfly) valve member may be configured to hold the valve member in a different, fixed (e.g. open) position, when power is lost to the PRSOV. The valve member of the PRSOV may be any suitable and desired valve member, not necessarily a butterfly valve. The valve member may be actuated by any suitable and desired electrically powered actuator (e.g. a torque motor, a direct drive, a geared drive, a pneumatic actuator controlled by a torque-motor servo-valve).

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pressure regulating shut-off valve having an inlet and an outlet, the valve comprising:
    a valve member arranged to regulate flow of a fluid between the inlet and the outlet of the pressure regulating shut-off valve;
    a pneumatic actuator comprising:
        a piston arranged for reciprocal motion in a cylinder;
        wherein the cylinder and a first face of the piston define a first volume that is fluidly connected to the inlet of the pressure regulating shut-off valve;
        wherein the cylinder and a second face of the piston define a second volume that is fluidly connected via a fluid path to the inlet of the pressure regulating shut-off valve; and
        wherein the second face of the piston has a surface area that is greater than a surface area of the first face of the piston; and
    an electrically actuated valve arranged to control the flow of fluid through the fluid path;
    wherein the electrically actuated valve is arranged to restrict or substantially close the fluid path between the inlet of the pressure regulating shut-off valve and the second volume, when power is supplied to the electrically actuated valve;
    wherein the electrically actuated valve is arranged to derestrict or substantially open the fluid path between the inlet of the pressure regulating shut-off valve and the second volume, when power is removed from the electrically actuated valve;
    wherein the pneumatic actuator is arranged to act on the valve member, when power is removed from the electrically actuated valve, to hold the valve member in a fixed position; and
    wherein the pneumatic actuator is arranged to not interfere with the valve member, when power is supplied to the electrically actuated valve.

2. The pressure regulating shut-off valve as claimed in claim 1, wherein the pressure regulating shut-off valve comprises a conduit;
  wherein the conduit comprises the inlet and the outlet and the valve member is located in the conduit between the inlet and the outlet;
  wherein the pneumatic actuator comprises a rod mechanically connected to the piston; and
  wherein the rod is external to the conduit and is arranged to act on the valve member.

3. The pressure regulating shut-off valve as claimed in claim 2, wherein the pressure regulating shut-off valve comprises a rotatable member mechanically coupled to the valve member; and
  wherein the rod is arranged to act on the rotatable member so to act on the valve member.

4. The pressure regulating shut-off valve as claimed in claim 3, wherein the valve member comprises a butterfly valve.

5. The pressure regulating shut-off valve as claimed in claim 1, wherein the pneumatic actuator is arranged to act on the valve member, when power is removed from the electrically actuated valve, to hold the valve member in an open position.

6. The pressure regulating shut-off valve as claimed in claim 1, wherein the pneumatic actuator is arranged to act on the valve member, when power is removed from the electrically actuated valve, to hold the valve member in a closed position.

7. The pressure regulating shut-off valve as claimed in claim 1, wherein the valve member is electrically actuated.

8. The pressure regulating shut-off valve as claimed in claim 7, wherein the electrically actuated valve member and the electrically actuated valve share a common power supply.

9. The pressure regulating shut-off valve as claimed in claim 1, wherein the electrically actuated valve comprises a normally open three-way solenoid valve.

10. The pressure regulating shut-off valve as claimed in claim 9, wherein the solenoid valve is arranged to fluidly connect the second volume to a vent, when power is supplied to the solenoid valve; and
  wherein the solenoid valve is arranged to fluidly connect the inlet of the pressure regulating shut-off valve and the second volume via the fluid path, when power is removed from the solenoid valve.

11. The pressure regulating shut-off valve as claimed in claim 1, wherein the electrically actuated valve is arranged to derestrict or substantially open the fluid path between the inlet of the pressure regulating shut-off valve and the second volume, when power is removed from the electrically actuated valve, so that substantially the same pressure is supplied to the first volume and to the second volume from the inlet of the pressure regulating shut-off valve.

12. A method of operating a pressure regulating shut-off valve, the pressure regulating shut-off valve as recited in claim 1, the method comprising:
  restricting or substantially closing the fluid path between the inlet of the pressure regulating shut-off valve and the second volume with the electrically actuated valve when power is supplied to the electrically actuated valve;
  derestricting or substantially opening the fluid path between the inlet of the pressure regulating shut-off valve and the second volume with the electrically actuated valve when power is removed from the electrically actuated valve; and
  hold the valve member in a fixed position with the pneumatic actuator when power is removed from the electrically actuated valve.

13. A pressure regulating shut-off valve having an inlet and an outlet, the valve comprising:
  a valve member arranged to regulate flow of a fluid between the inlet and the outlet of the pressure regulating shut-off valve;
  a pneumatic actuator comprising:
    a piston arranged for reciprocal motion in a cylinder;
    wherein the cylinder and a first face of the piston define a first volume that is fluidly connected to the inlet of the pressure regulating shut-off valve;
    wherein the cylinder and a second face of the piston define a second volume that is fluidly connected via a fluid path to the inlet of the pressure regulating shut-off valve; and
    wherein the second face of the piston has a surface area that is greater than a surface area of the first face of the piston; and
  an electrically actuated valve arranged to control the flow of fluid through the fluid path;
  wherein the electrically actuated valve is arranged to restrict or substantially close the fluid path between the inlet of the pressure regulating shut-off valve and the second volume, when power is supplied to the electrically actuated valve;
  wherein the electrically actuated valve is arranged to derestrict or substantially open the fluid path between the inlet of the pressure regulating shut-off valve and the second volume, when power is removed from the electrically actuated valve;
  wherein the pneumatic actuator is arranged to act on the valve member, when power is removed from the electrically actuated valve, to hold the valve member in a fixed position;
  wherein the piston is arranged to move from a first position to a second position, when power is removed from the electrically actuated valve;
  wherein when the piston is in the first position, the pneumatic actuator is arranged to not interfere with the valve member; and
  wherein when the piston is in the second position, the pneumatic actuator is arranged to act on the valve member, to hold the valve member in a fixed position.

14. A pressure regulating shut-off valve having an inlet and an outlet, the valve comprising:
  a valve member arranged to regulate flow of a fluid between the inlet and the outlet of the pressure regulating shut-off valve;
  a pneumatic actuator comprising:
    a piston arranged for reciprocal motion in a cylinder;
    wherein the cylinder and a first face of the piston define a first volume that is fluidly connected to the inlet of the pressure regulating shut-off valve;
    wherein the cylinder and a second face of the piston define a second volume that is fluidly connected via a fluid path to the inlet of the pressure regulating shut-off valve; and
    wherein the second face of the piston has a surface area that is greater than a surface area of the first face of the piston; and
  an electrically actuated valve arranged to control the flow of fluid through the fluid path;
  wherein the electrically actuated valve is arranged to restrict or substantially close the fluid path between the inlet of the pressure regulating shut-off valve and the second volume, when power is supplied to the electrically actuated valve;

wherein the electrically actuated valve is arranged to derestrict or substantially open the fluid path between the inlet of the pressure regulating shut-off valve and the second volume, when power is removed from the electrically actuated valve;

wherein the pneumatic actuator is arranged to act on the valve member, when power is removed from the electrically actuated valve, to hold the valve member in a fixed position;

wherein the pneumatic actuator is arranged to be removed from acting on the valve member, when power is resupplied to the electrically actuated valve after the power has been removed from the electrically actuated valve.

* * * * *